US009769032B1

(12) United States Patent
Ghodsi et al.

(10) Patent No.: US 9,769,032 B1
(45) Date of Patent: Sep. 19, 2017

(54) CLUSTER INSTANCE MANAGEMENT SYSTEM

(71) Applicant: Databricks Inc., San Francisco, CA (US)

(72) Inventors: Ali Ghodsi, Berkeley, CA (US); Ion Stoica, Piedmont, CA (US); Matei Zaharia, Boston, MA (US)

(73) Assignee: Databricks Inc., San Francisco, CA (US)

( * ) Notice: Subject to any disclaimer, the term of this patent is extended or adjusted under 35 U.S.C. 154(b) by 294 days.

(21) Appl. No.: 14/663,748

(22) Filed: Mar. 20, 2015

(51) Int. Cl.
  *G06F 15/16* (2006.01)
  *H04L 12/24* (2006.01)
  *H04L 29/08* (2006.01)
  *H04L 12/26* (2006.01)

(52) U.S. Cl.
  CPC .......... *H04L 41/50* (2013.01); *H04L 41/0654* (2013.01); *H04L 43/0805* (2013.01); *H04L 67/10* (2013.01)

(58) Field of Classification Search
  CPC ....... G06F 9/46; H04L 41/50; H04L 41/0654; H04L 43/0805; H04L 67/10
  USPC ........................................................ 709/224
  See application file for complete search history.

(56) References Cited

U.S. PATENT DOCUMENTS

| | | | | |
|---|---|---|---|---|
| 7,069,317 B1* | 6/2006 | Colrain | ............... | G06F 11/2025 709/224 |
| 8,676,622 B1* | 3/2014 | Ward, Jr. | ......... | G06Q 10/06313 705/7.11 |
| 8,839,222 B1* | 9/2014 | Brandwine | ............. | G06F 11/36 717/168 |
| 9,208,032 B1* | 12/2015 | McAlister | ........... | G06F 11/1435 |
| 9,306,814 B1* | 4/2016 | Roth | ...................... | H04L 41/085 |
| 9,430,280 B1* | 8/2016 | Shih | ........................ | G06F 9/485 |
| 9,438,529 B1* | 9/2016 | Kowalski | ................ | H04L 47/70 |
| 9,451,013 B1* | 9/2016 | Roth | .................... | H04L 67/1097 |
| 9,479,382 B1* | 10/2016 | Ward, Jr. | .................. | G06F 9/50 |
| 9,529,682 B2* | 12/2016 | McAlister | ........... | G06F 11/1435 |
| 2011/0264748 A1* | 10/2011 | Pouzin | ................... | G06F 9/5011 709/206 |
| 2013/0247034 A1* | 9/2013 | Messerli | ............. | G06F 9/45533 718/1 |
| 2013/0304904 A1* | 11/2013 | Mouline | ............... | H04L 43/045 709/224 |
| 2014/0047086 A1* | 2/2014 | Klimetschek | ......... | G06F 15/177 709/222 |
| 2014/0173618 A1* | 6/2014 | Neuman | ............... | G06F 9/5066 718/104 |
| 2014/0195687 A1* | 7/2014 | Rewaskar | ............... | H04L 67/34 709/226 |
| 2014/0229221 A1* | 8/2014 | Shih | .................. | G06Q 10/06313 705/7.23 |

(Continued)

*Primary Examiner* — Imad Hussain
(74) *Attorney, Agent, or Firm* — Van Pelt, Yi & James LLP

(57) ABSTRACT

A system for cluster management comprises a status monitor and an instance replacement manager. The status monitor is for monitoring status of an instance of a set of instances on a cluster provider. The instance replacement manager is for determining a replacement strategy for the instance in the event the instance does not respond. The replacement strategy for the instance is based at least in part on a management criteria for on-demand instances and spot instances on the cluster provider.

21 Claims, 6 Drawing Sheets

(56) References Cited

U.S. PATENT DOCUMENTS

| | | | |
|---|---|---|---|
| 2014/0280595 A1* | 9/2014 | Mani | H04L 12/1827 709/204 |
| 2014/0297868 A1* | 10/2014 | Ennaji | H04L 47/828 709/226 |
| 2015/0040117 A1* | 2/2015 | Fitzgerald, II | G06F 9/45533 717/172 |
| 2015/0058195 A1* | 2/2015 | Comly | G06Q 50/18 705/37 |
| 2015/0169624 A1* | 6/2015 | Gupta | G06F 17/3089 707/639 |
| 2015/0244595 A1* | 8/2015 | Oberlin | H04L 41/5025 709/224 |
| 2015/0271092 A1* | 9/2015 | Ward, Jr. | H04L 67/10 709/226 |
| 2016/0085643 A1* | 3/2016 | McAlister | G06F 11/1435 714/4.12 |

* cited by examiner

CLUSTER INSTANCE MANAGEMENT SYSTEM

BACKGROUND OF THE INVENTION

A cluster provider provides cloud computing instances that can be rented (e.g., by the hour) and configured to perform cloud computing jobs. Demand for cloud computing services varies over time; enough cloud computing instances exist to satisfy even a peak demand. A varying number of unused cloud computing instances therefore are available at any given time. In order to derive some value from the unused cloud computing instances, the cluster provider offers them for use at a lower rate, with the caveat that they may be recalled at any time. It is in a customer's best interest to take advantage of the lower rate, however, the desire for the lower rate must be balanced against the risk of losing computing resources at any time.

BRIEF DESCRIPTION OF THE DRAWINGS

Various embodiments of the invention are disclosed in the following detailed description and the accompanying drawings.

DETAILED DESCRIPTION

Figure 1:
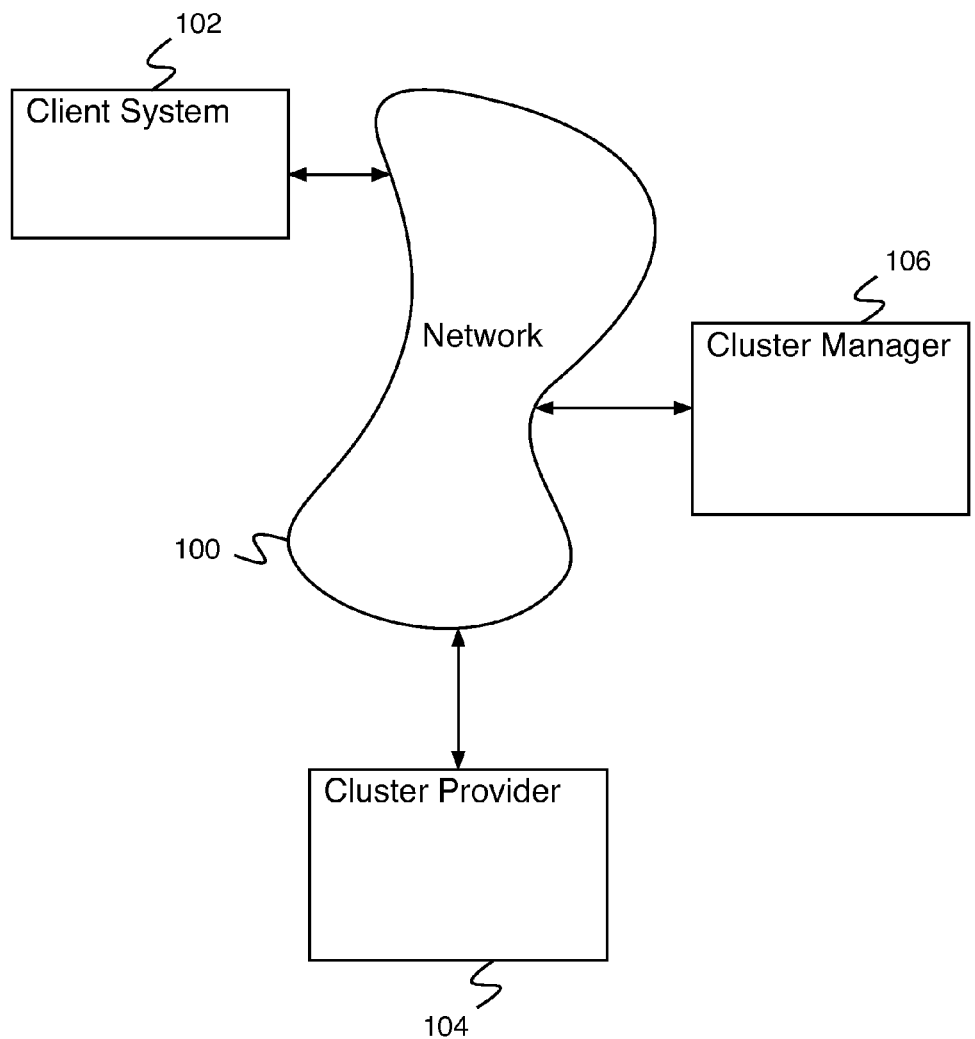
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for cluster management is disclosed. The system for cluster management comprises a status monitor for monitoring status of an instance of a set of instances on a cluster provider and an instance replacement manager for determining a replacement strategy for the instance in the event the instance does not respond, wherein the replacement strategy for the instance is based at least in part on a management criteria for on-demand instances and spot instances on the cluster provider.

In some embodiments, a system for cluster management maintains a cluster on cloud computing instances that are each rented from a cloud computing provider. The cloud computing provider rents out as many computing instances as is desired at a fixed rate, referred to as on-demand instances. Additional cloud computing instances that have not been rented as on-demand instances are put up for rent as spot instances. Spot instances are put up for rent at a lower rent than on-demand instances in order to encourage their use. In some embodiments, spot instances are put up for rent at a predetermined lower rate. In some embodiments, spot instances are put up for rent at a rate that is determined when they are rented (e.g., they are auctioned). If all cloud computing instances not rented as on-demand instances are rented as spot instances and a request for a new on-demand instance is received by the cloud computing provider, the cloud computing provider will deactivate one spot instance (e.g., the youngest spot instance, the oldest spot instance, the spot instance rented for the lowest amount of money, a random spot instance, etc.) and rent the instance instead as an on-demand instance (e.g., in order to make more money from the instance). Building a computing cluster from spot instances is thus inherently unreliable, since any spot instance may be deactivated at any time; the unreliability of the resource is the tradeoff for the lower price.

In some embodiments, a system for cluster management receives a management criteria for on demand instances and spot instances of a cluster provider from a computing client and maintains a computing cluster on cloud computing instances rented from a cloud computing provider according to the management criteria. In various embodiments, the management criteria comprises a maximum number of on-demand instances, a minimum number of on-demand instances, a maximum number of total instances, a minimum number of total instances, a budget limit, a failure criterion, a reserve criterion, a reserve pool size, or any other appropriate management criteria. In some embodiments, the management criteria comprises a minimum number of total instances, a maximum number of total instances, and a maximum number of on-demand instances (e.g., "I need a cluster with a total of 10-15 instances and no more than 3 on-demand instances"). The system for cluster management builds the cluster, if possible, according to the criteria. The system for cluster management then monitors the status of the instances in the cluster (e.g., of one selected instance, of all instances, of all spot instances, etc.). In the event it is determined that an instance does not respond (e.g., the instance has been deactivated by the cluster provider), the system for cluster management determines a replacement strategy. In various embodiments, the replacement strategy comprises replacing the instance with a spot instance from a reserve pool (e.g., the system for cluster management maintains a reserve pool of spot instances for allocating to clusters in the event a spot instance is deactivated), the replacement strategy comprises replacing the instance with an on-demand instance in the event that this is allowed under the management criteria (e.g., in the event that another on-demand instance can be rented without going over the on-demand instance limit in the management criteria), the replacement strategy comprises monitoring for a replacement instance (e.g., in the event that the reduced size cluster is still within the size limits indicated in the management criteria), the replacement strategy comprises stopping the cluster (e.g., in the event that the reduced size cluster is no longer within the size limits indicated in the management criteria), the replacement strategy comprises stopping the cluster and saving the cluster state, the replacement strategy comprises maintaining one on-demand instance (e.g., to preserve the cluster state), or the replacement strategy comprises any other appropriate replacement strategy.

FIG. 1 is a block diagram illustrating an embodiment of a network system. In some embodiments, the network system of FIG. 1 comprises a system for cluster management. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. Client system 102, cluster provider 104, and cluster manager 106 communicate via network 100. In some embodiments, client system 102 comprises a computing system client. In some embodiments, client system 102 comprises a client system for requesting cloud computing jobs. In some embodiments, client system 102 comprises a client system for managing a cloud computing cluster. In some embodiments, client system 102 comprises a client system for providing a management criteria for on-demand instances and spot instances. Cluster provider 104 comprises a system for providing a cloud computing cluster. In some embodiments, cluster provider 104 comprises a system for providing computing instances (e.g., remotely accessible instantiations of computing systems) and enabling interconnections between the computing instances (e.g., to form a computing cluster). In some embodiments, cluster provider 104 provides on-demand instances (e.g., computing instances available at a fixed or set cost, available at any time for as long as is necessary, at a higher cost compared to the spot instances, or premium cost, etc.). In some embodiments, cluster provider 104 provides spot instances (e.g., computing instances available at a predetermined lower cost compared to the on-demand instances, or a cost determined by auction or other means, available only some of the time and able to be recalled by cluster provider 104 at any point in time for other uses). Cluster manager 106 comprises a cluster management system. In some embodiments, cluster manager 106 comprises a system for receiving a cluster request (e.g., from a client system such as client system 102, e.g., comprising a management criteria for on-demand instances and spot instances). In some embodiments, cluster manager 106 comprises a system for providing cluster management commands (e.g., to a cluster provider such as cluster provider 104). In some embodiments, cluster manager 106 comprises a system for requesting on-demand instances and spot instances. In some embodiments, cluster manager 106 comprises a system for monitoring the status of one or more instances. In some embodiments, cluster manager 106 comprises a system for determining a replacement strategy for an instance in the event an instance does not respond to a status monitoring request.

Figure 2:
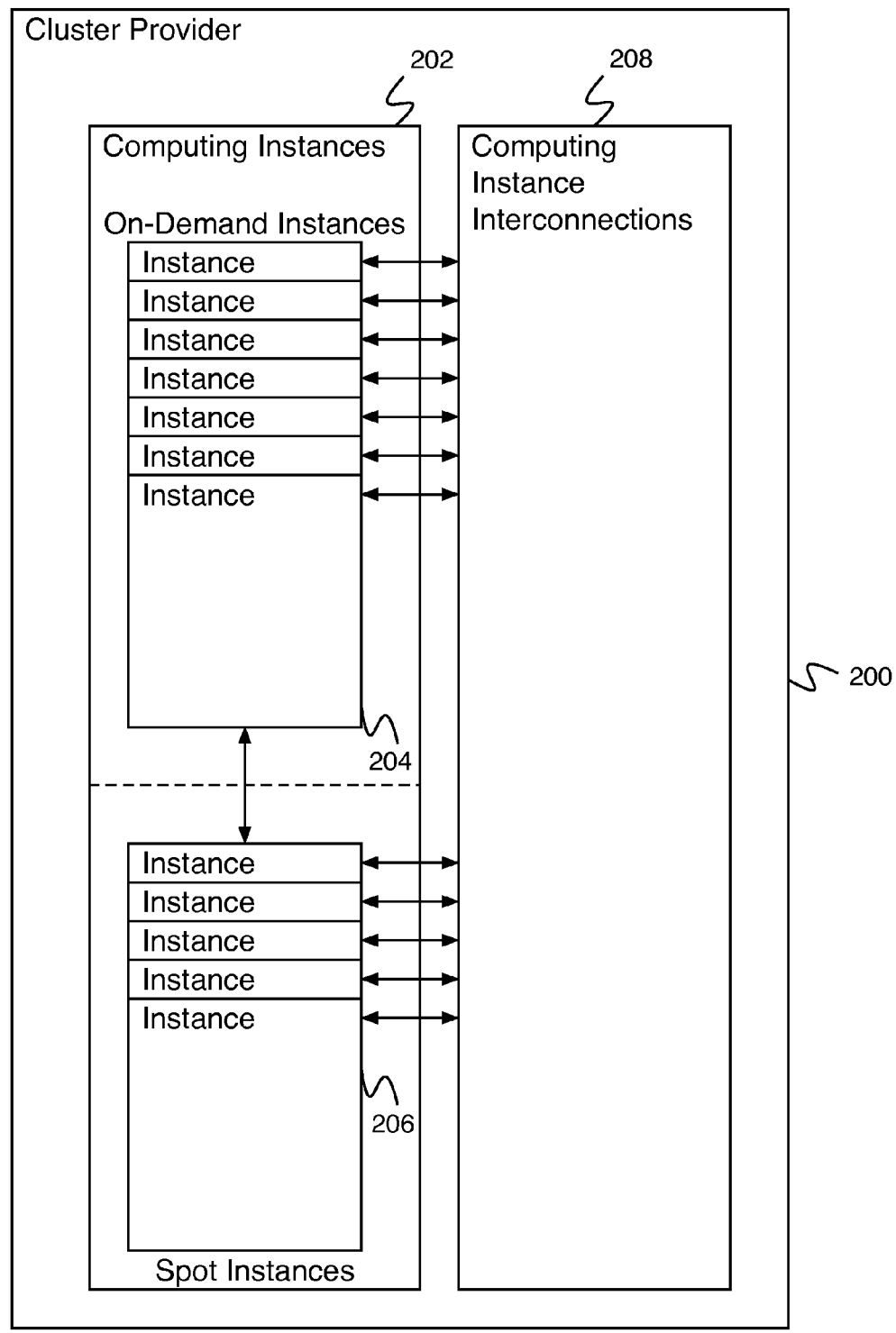
FIG. 2 is a block diagram illustrating an embodiment of a cluster provider.

FIG. 2 is a block diagram illustrating an embodiment of a cluster provider. In some embodiments, cluster provider 200 comprises cluster provider 104 of FIG. 1. In some embodiments, cluster provider 200 is in communication with a cluster manager (e.g., cluster manager 106 of FIG. 1). In the example shown, cluster provider 200 comprises computing instances 202. Computing instances 202 comprise a set of computing instances (e.g., computers, virtual machines, etc.). Each computing instance of the set of computing instances is available for use by a computing system user for a time-based fee (e.g., for rent). In the example shown, some of computing instances 202 comprise on-demand instances (e.g., on-demand instance 204). Some of computing instances 202 comprise spot instances (e.g., spot instance 206). In some embodiments, any given computing instance of computing instances 202 can comprise either an on-demand instance or a spot instance. In some embodiments, all computing instances of computing instances 202 comprise on-demand instances. In some embodiments, cluster provider 200 rents out as many instances as possible as on-demand instances. Any instances not rented by cluster provider 200 as on-demand instances are made available for rent as spot instances. An instance that is not rented may be rented either as an on-demand instance (e.g., in order to guarantee reliability) or as a spot instance (e.g., in order to get a better price). In some embodiments, in the event that all instances are rented, (e.g., either as on-demand instances or spot instances), and a request is received by cluster provider 200 for a rental of a new on-demand instance, a spot instance is selected by cluster provider 200 (e.g., at random, based at least in part on its rental price, based at least in part on its rental time, etc.), deactivated, and reactivated as an on-demand instance for requestor of the on-demand instance. In some embodiments, in the event that all instances are rented, (e.g., either as on-demand instances or spot instances), and a request is received by cluster provider 200 for a rental of a new spot instance, cluster provider 200 determines whether it can rent a spot instance to the requestor of the spot instance for a higher rate than a current spot instance (e.g., in some embodiments, spot instances are rented out at different rates according to an auction process; the cluster provider determines whether the rate can be raised for any currently rented spot instance) and in the event that it can, the current spot instance is deactivated and reactivated at the higher rate for the requestor of the spot instance. In some embodiments, in the event that a rate cannot be raised (e.g., the rate requested by the requestor of the spot instance is less than or equal to currently rented spot instances), the request is denied. In the example shown, cluster provider 200 comprises computing instance interconnections 208. In some embodiments, computing instance interconnections 208 comprises a set of interconnections (e.g., a network) for allowing the computing instances of computing instances 202 to communicate with one another. In some embodiments, computing instances of computing instances 202 communicating via computing instance interconnections 208 comprise a computing cluster.

Figure 3:
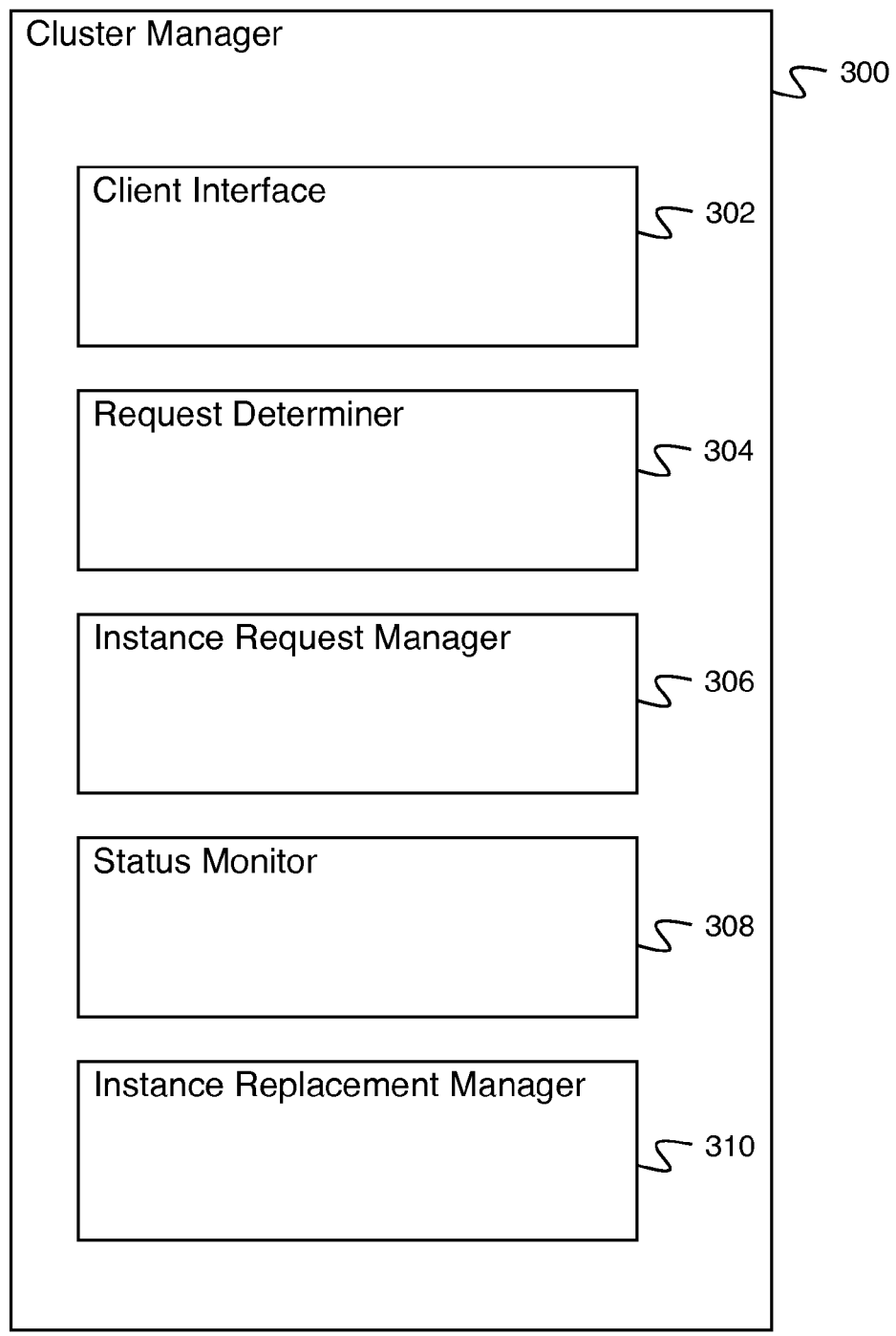
FIG. 3 is a block diagram illustrating an embodiment of a cluster manager.

FIG. 3 is a block diagram illustrating an embodiment of a cluster manager. In some embodiments, the cluster manager of FIG. 3 comprises cluster manager 106 of FIG. 1. In the example shown, cluster manager 300 comprises client interface 302. In some embodiments, client interface 302 comprises a client interface for communicating with a client system. In some embodiments, client interface 302 comprises a client interface for receiving management criteria for on-demand instances and spot instances on a cluster provider. In some embodiments, client interface 302 comprises a client interface for providing a status report, for providing an indication that a cluster has been created, for providing an indication that a request for a cluster was rejected, for providing an indication that an instance of a cluster has been deactivated, for providing an indication that a cluster has been shut down, or for providing any other appropriate indication. In some embodiments, client interface 302 is implemented using a processor. Request determiner 304 comprises a request determiner for determining a request. In some embodiments, request determiner 304 determines a request for a cluster provider. In some embodiments, a request is based at least in part on management criteria for on-demand instances and spot instances on a cluster provider. In some embodiments, a request comprises a request for on-demand instances (e.g., zero or more on-demand instances) and a request for spot instances (e.g., zero or more spot instances). In some embodiments, a request comprises a range of spot instances. In some embodiments, a request comprises a target spot instance price. In some embodiments, a request comprises a maximum spot instance price. In some embodiments, a request comprises a budget maximum. In some embodiments, a request is based at least in part on a cluster availability (e.g., a cluster availability received from a cluster provider, e.g., in conjunction with a rejection of a request). In some embodiments, request determiner 304 determines a request strategy based at least in part on cluster availability and on management criteria. In some embodiments, a request determiner is implemented using a processor. Instance request manager 306 comprises an instance request manager for providing an instance request. In various embodiments, instance request manager 306 provides an instance request determined by request determiner 304 on a cluster provider, determines availability of a set of instances (e.g., comprising an instance request) on a cluster provider, indicates to create a set of instances on a cluster provider in response to an indication that there is availability of the set of instances, or executes any other appropriate instance request function. In some embodiments, instance request manager 306 is implemented using a processor. Status monitor 308 comprises a status monitor for monitoring status of instances. In some embodiments, status monitor 308 monitors status of an instance on a cluster provider. In various embodiments, status monitor 308 monitors status of a single instance on a cluster provider, of each instance of a cluster on a cluster provider, of each spot instance of a cluster on a cluster provider, or of any other appropriate instance or instances. In various embodiments, monitoring status of an instance comprises determining whether the instance is enabled, determining response time of the instance, determining processor load of the instance, determining memory load of the instance, determining remaining storage capacity on the instance, determining jobs running on the instance, determining communication bandwidth of the instance, or determining any other appropriate status. In some embodiments, status monitor 308 is implemented using a processor. Instance replacement manager 310 comprises an instance replacement manager for determining an instance replacement strategy. In some embodiments, instance replacement manager 310 determines a replacement strategy for an instance in the event the instance does not respond, wherein the replacement strategy for the instance is based at least in part on a management criteria for on-demand instances and spot instances on the cluster provider. In some embodiments, instance replacement manager 310 is implemented using a processor. In various embodiments, the elements of cluster manager 310 are each implemented on their own processor, are all implemented on a single processor, or are implemented shared between multiple processors in any appropriate way.

Figure 4A:
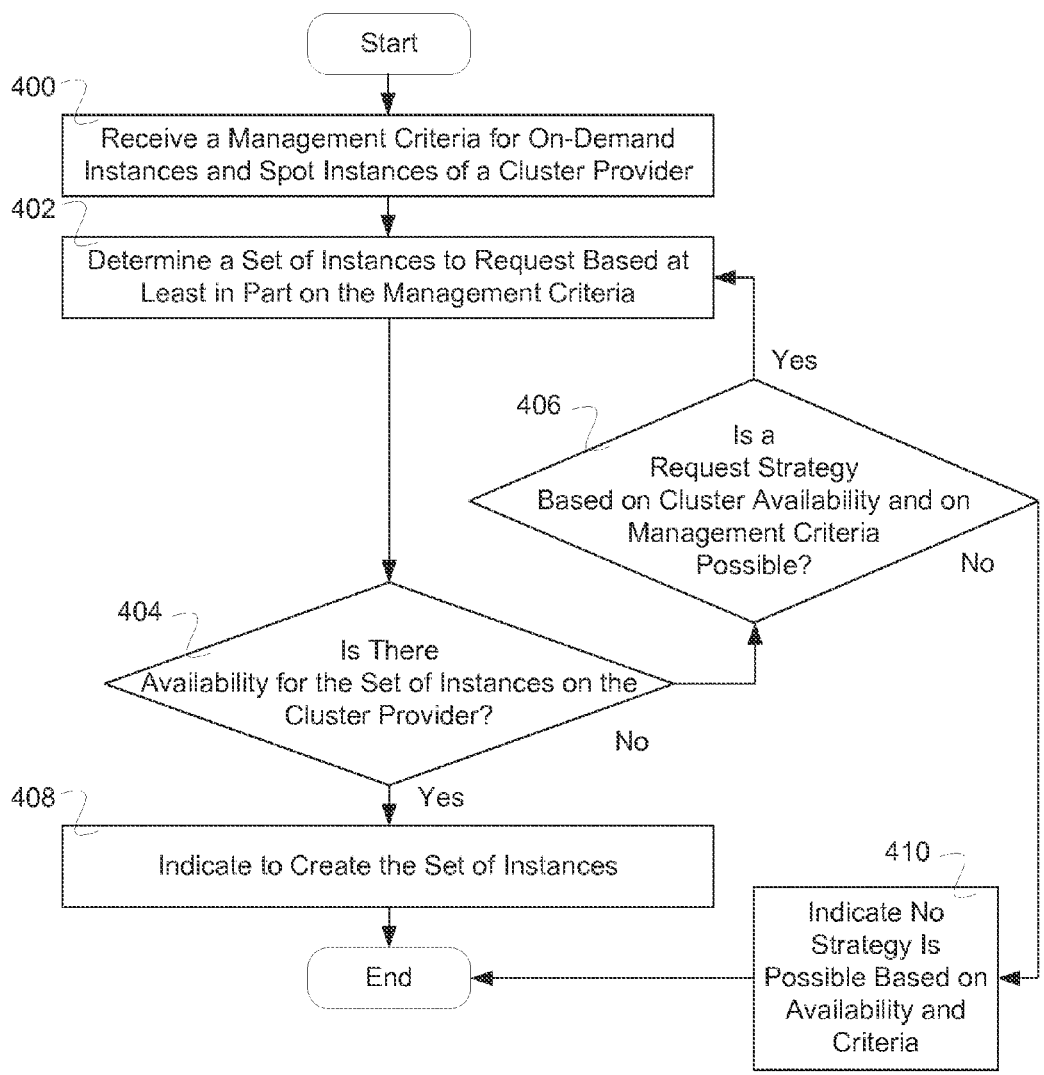
FIG. 4A is a flow diagram illustrating an embodiment of a process for a cluster instance management system.

FIG. 4A is a flow diagram illustrating an embodiment of a process for a cluster instance management system. In some embodiments, the process of FIG. 4A is executed by cluster manager 106 of FIG. 1. In the example shown, in 400, a management criteria for on-demand instances and spot instances of a cluster provider is received. In some embodiments, a management criteria is received from a client system. In some embodiments, a management criteria is received as part of a request for a cluster. In 402, a set of instances to request is determined based at least in part on the management criteria. In some embodiments, the set of instances to request is determined based at least in part on a request strategy. In 404, it is determined whether there is availability for the set of instances on the cluster provider. In some embodiments, determining whether there is availability for the set of instances comprises determining whether enough spot instances are available. In some embodiments, determining whether there is availability for the set of instances comprises determining whether spot instances are available at an acceptable price. In the event it is determined that there is availability for the set of instances on the cluster provider, control passes to 408. In 408, an indication is provided to create the set of instances (e.g., the set of instances for which availability is determined in 404), and the process ends. In the event it is determined that there is not availability for the set of instances on the cluster provider, control passes to 406. In 406, it is determined whether a request strategy based on the cluster availability and on the management criteria is possible. For example, it is determined whether any new strategy for requesting instances on the cluster provider is possible by determining the number of available on-demand instances and the number of spot instances and whether any scenario based on the management criteria will work. In some embodiments, determining a request strategy based at least in part on cluster availability and on the management criteria comprises determining a strategy for a revised request for a set of instances. In some embodiments, a request strategy comprises a strategy for requesting a set of instances for which there is availability on the cluster provider. In the event that a request strategy is possible, then control then passes to 402. In the event no request strategy is possible, then in 410 it is indicated that no strategy is possible based on the availability and on the criteria, and the process ends.

Figure 4B:
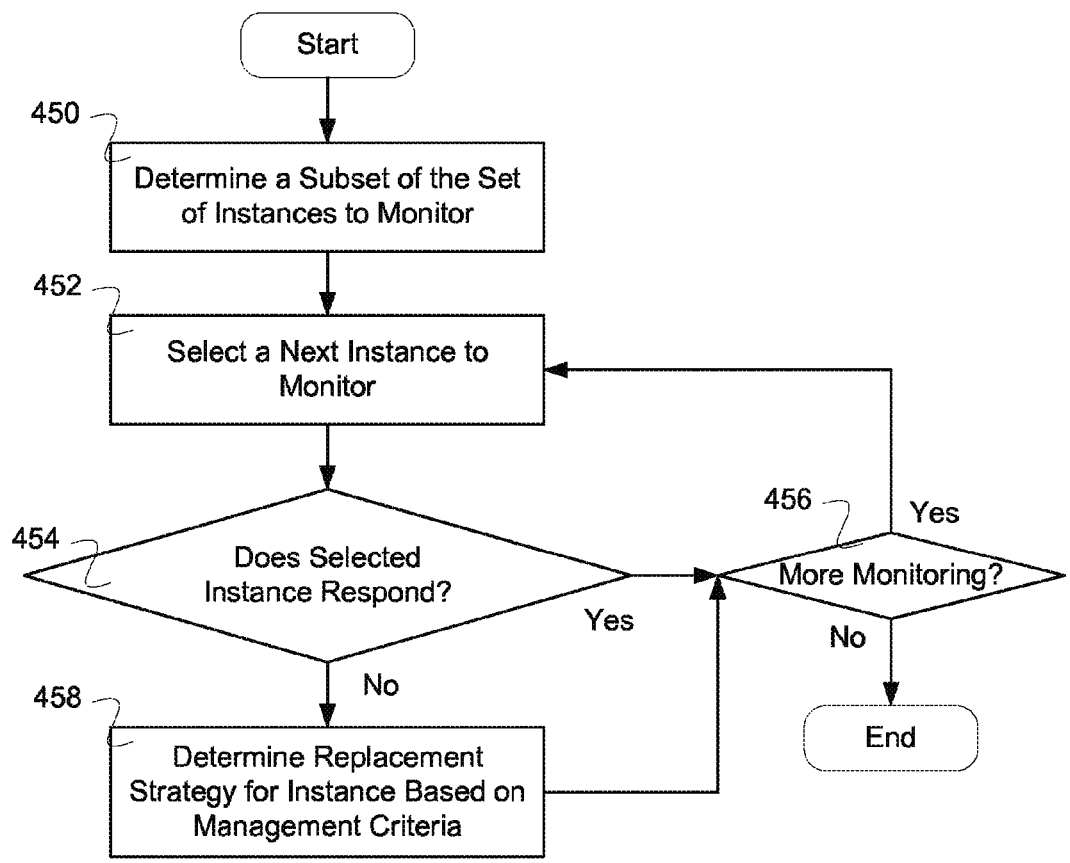
FIG. 4B is a flow diagram illustrating an embodiment of a process for a cluster instance management system.

FIG. 4B is a flow diagram illustrating an embodiment of a process for a cluster instance management system. In some embodiments, the process of FIG. 4B is executed by cluster manager 106 of FIG. 1. In the example shown, in 450 a subset of the set of instances to monitor is determined. For example, all the instances are monitored for responsiveness, spot instances are monitored for responsiveness, or any other appropriate subset of the instances in the cluster are monitored for responsiveness. In 452, a next instance to monitor is selected. In 454, it is determined whether the selected instance is responsive. For example, a message is sent to the instance (e.g., a status request, a ping, etc.) and a reply is received that indicates the instance is functional. In the event that the selected instance is not responsive, then in 458 a replacement strategy for the instance is determined based on the management criteria, and control passes to 456. For example, a spot instance from a reserve pool or an on-demand instance (in the event it is allowed according to the management criteria) is selected as a replacement instance. In 410, the status of an instance of the set of instances on the cluster provider is monitored. In the event that the selected instance is responsive, control passes to 456. In 456, it is determined whether there is more monitoring to be done. In the event that there is no more monitoring to be done, then the process ends. In the event that there is more monitoring to be done, then control passes to 452.

Figure 5:
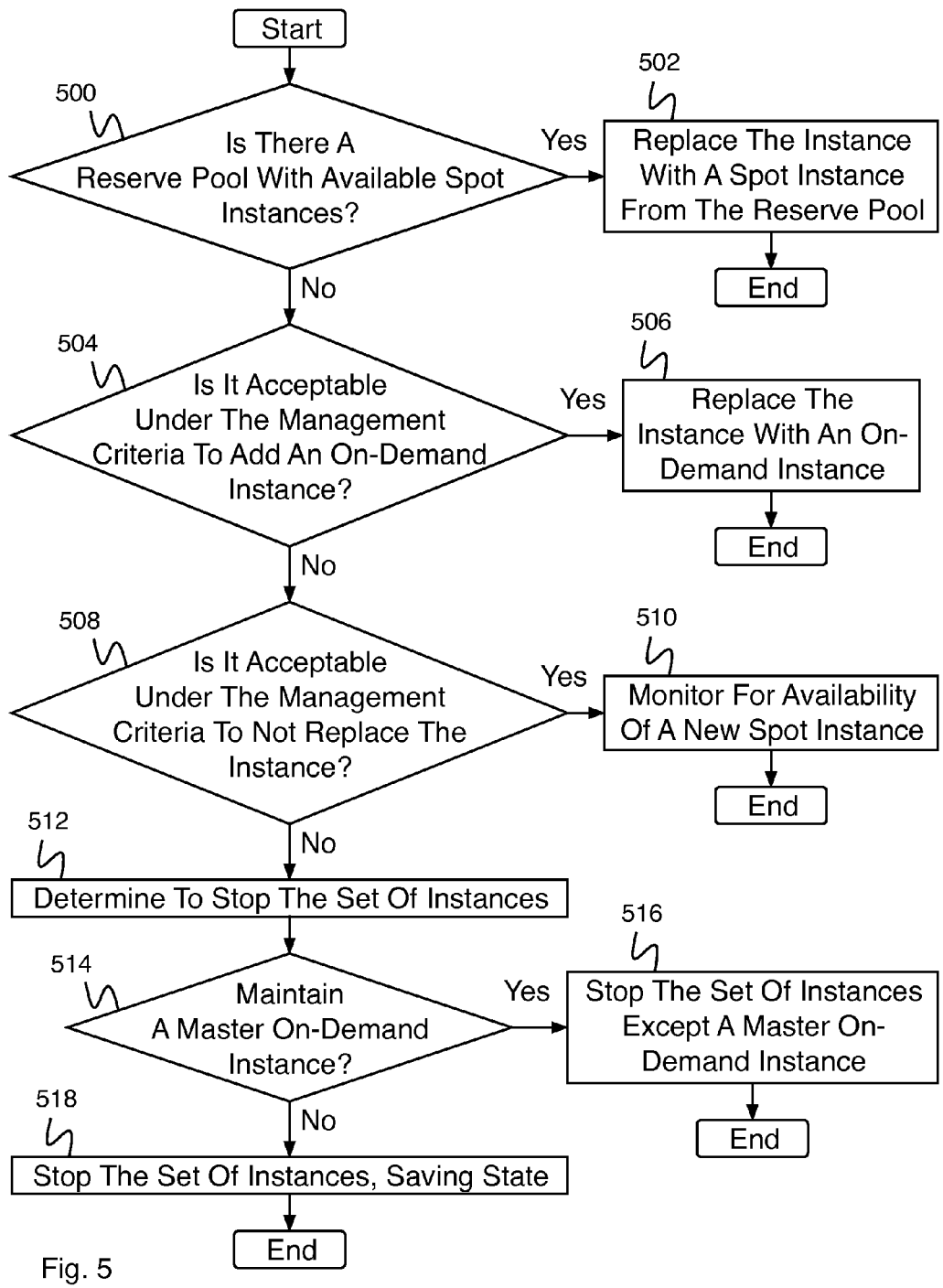
FIG. 5 is a flow diagram illustrating an embodiment of a process for determining a replacement strategy for an instance based at least in part on a management criteria.

FIG. 5 is a flow diagram illustrating an embodiment of a process for determining a replacement strategy for an instance based at least in part on a management criteria. In some embodiments, the process of FIG. 5 implements 458 of FIG. 4B. In some embodiments, the process of FIG. 5 comprises a process for replacing a deactivated spot instance of a set of instances on a cluster provider. In the example shown, in 500, it is determined whether there is a reserve pool with available spot instances. In some embodiments, a cluster manager maintains a reserve pool of spot instances (e.g., a set of spot instances on the cluster provider reserved by the cluster manager) able to be assigned to a set of instances for a client in the event a spot instance of a set of instances is deactivated. In the event it is determined that there is not a reserve pool with available spot instances, control passes to 504. In the event it is determined that there is a reserve pool with available spot instances, control passes to 502. In 502, the instance is replaced with a spot instance from the reserve pool, and then the process ends. For example, a new instance is populated with the functionality of the instance that became non-responsive and is connected with the rest of the operating cluster (e.g., is placed in communication with the cluster and with a master node of the cluster). In various embodiments, the master instance is informed of the non-responsive instance, is queried as to the task that the non-responsive instance was performing, is provided with the new instance that replaces the non-responsive instance, sets up the new instance to perform the task(s) of the non-responsive instance, or any other appropriate process to enable the new instance to perform as part of the cluster. In some embodiments, upgrade functions are run to ensure that the correct version of all software is running on that instance. Thereafter, all the relevant software is started such that the instance can be managed. Any state that has been saved about any previous instance which is to be replaced is fetched. After this the cluster manager can start using the instance as a replacement for the old one.

In 504, it is determined whether it is acceptable under the management criteria to add an on-demand instance (e.g., whether the total number of on-demand instances in the set of instances is less than the total number of on-demand instances allowed under the management criteria). In the event it is determined that it is not acceptable under the management criteria to add an on-demand instance, control passes to 508. In the event it is determined that it is acceptable under the management criteria to add an on-demand instance, control passes to 506. In 506, the deactivated spot instance is replaced with an on-demand instance, and then the process ends. For example, a new instance is populated with the functionality of the instance that became non-responsive and is connected with the rest of the operating cluster (e.g., is placed in communication with the cluster and with a master node of the cluster). In various embodiments, the master instance is informed of the non-responsive instance, is queried as to the task that the non-responsive instance was performing, is provided with the new instance that replaces the non-responsive instance, sets up the new instance to perform the task(s) of the non-responsive instance, or any other appropriate process to enable the new instance to perform as part of the cluster. In some embodiments, upgrade functions are run to ensure that the correct version of all software is running on that instance. Thereafter, all the relevant software is started such that the instance can be managed. Any state that has been saved about any previous instance which is to be replaced is fetched. After this the cluster manager can start using the instance as a replacement for the old one.

In 508, it is determined whether it is acceptable under the management criteria to not replace the deactivated spot instance (e.g., if the set of instances is still within the acceptable size range indicated in the management criteria without replacing the instance). In the event it is determined that it is not acceptable under the management criteria to not replace the deactivated spot instance, control passes to 512. In the event it is determined that it is acceptable under the management criteria to not replace the deactivated spot instance, control passes to 510. In 510, availability of a new spot instance is monitored, and then the process ends. For example, the deactivated spot instance is not replaced immediately, however, when a new spot instance becomes available, it is acquired to replace the deactivated spot instance. In 512, it is determined to stop the set of instances. For example, because there is no replacement strategy acceptable under the management criteria to continue the set of instances running, the instances of the cluster are to be stopped in an orderly fashion (e.g., the state of the cluster is stored or the state of the progress to a solution is stored so that upon resources becoming available, the cluster can be restarted to continue its function).

In 514, it is determined whether to maintain a master on-demand instance. In the event it is determined not to maintain a master on-demand instance, control passes to 518. In the event it is determined to maintain a master on-demand instance, control passes to 516. In 516, the set of instances is stopped except a master on-demand instance, and then the process ends. For example, a master on-demand instance maintains the state of the set of instances and allows the set of instances to be brought back efficiently at a later time. In 518, the set of instances is stopped, saving state. For example, the cluster is stopped and the state of the cluster is saved. In some embodiments, first any outstanding operations are flushed so the instance does not take on new tasks. Then synchronize all the instance's state to a database. Thereafter all logs are synchronized to a centralized storage system. After this the system can be restarted. In some embodiments, the state is saved on the cluster manager.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for cluster management, comprising:
   a processor; and
   a memory coupled with the processor, wherein the memory is configured to provide the processor with instructions which when executed cause the processor to:
      monitor status of an instance of a set of instances on a cluster provider; and
      determine a replacement strategy for the instance in the event the instance does not respond, wherein the replacement strategy for the instance is based at least in part on a management criteria for on-demand instances and spot instances on the cluster provider, wherein the determining of the replacement strategy comprises to:
determine whether it is acceptable to not replace the instance immediately based on the management criteria; and
in response to a determination that it is acceptable to not replace the instance immediately based on the management criteria:
monitor availability of a new spot instance; and
in response to a determination that the new spot instance is available, replace the instance that does not respond with the new spot instance.

2. A system as in claim 1, wherein the processor is further configured to receive the management criteria.

3. A system as in claim 2, wherein the management criteria comprise one or more of the following: a maximum number of on-demand instances or a minimum number of on-demand instances.

4. A system as in claim 2, wherein the management criteria comprise one or more of the following: a maximum number of total instances or a minimum number of total instances.

5. A system as in claim 2, wherein the management criteria comprise a budget limit.

6. A system as in claim 2, wherein the management criteria comprise a failure criterion.

7. A system as in claim 2, wherein the management criteria comprise a reserve criterion.

8. A system as in claim 2, wherein the management criteria comprise a reserve poolsize.

9. A system as in claim 1, wherein the processor is further configured to determine a new set of instances to request based at least in part on the management criteria.

10. A system as in claim 9, wherein the processor is further configured to:
determine availability of the new set of instances on the cluster provider; and
in the event there is availability, indicate to create the new set of instances.

11. A system as in claim 9, wherein the processor is further configured to determine a request strategy based at least in part on a cluster availability and on the management criteria.

12. A system as in claim 1, wherein the monitoring of the status comprising to monitor the status of the instance periodically.

13. A system as in claim 1, wherein the monitoring of the status comprising to monitor the status of each instance of the set of instances.

14. A system as in claim 1, wherein the monitoring of the status comprising to monitor the status of each spot instance of the set of instances.

15. A system as in claim 1, wherein the replacement strategy comprises replacing the instance with a spot instance from a reserve pool.

16. A system as in claim 1, wherein the replacement strategy comprises replacing the instance with an on-demand instance in the event that this is allowed under the management criteria.

17. A system as in claim 1, wherein the replacement strategy comprises stopping the set of instances.

18. A system as in claim 17, wherein the replacement strategy comprises saving the state of the set of instances.

19. A system as in claim 17, wherein the replacement strategy comprises maintaining one on-demand instance of the set of instances.

20. A method for cluster management, comprising:
monitoring status of an instance of a set of instances on a cluster provider; and
determining, using a processor, a replacement strategy for the instance in the event the instance does not respond, wherein the replacement strategy for the instance is based at least in part on a management criteria for on-demand instances and spot instances on the cluster provider, wherein the determining of the replacement strategy comprises:
determining whether it is acceptable to not replace the instance immediately based on the management criteria; and
in response to a determination that it is acceptable to not replace the instance immediately based on the management criteria:
monitoring availability of a new spot instance; and
in response to a determination that the new spot instance is available, replacing the instance that does not respond with the new spot instance.

21. A computer program product for cluster management, the computer program product being embodied in a non-transitory computer readable storage medium and comprising computer instructions for:
monitoring status of an instance of a set of instances on a cluster provider; and
determining a replacement strategy for the instance in the event the instance does not respond, wherein the replacement strategy for the instance is based at least in part on a management criteria for on-demand instances and spot instances on the cluster provider, wherein the determining of the replacement strategy comprises:
determining whether it is acceptable to not replace the instance immediately based on the management criteria; and
in response to a determination that it is acceptable to not replace the instance immediately based on the management criteria:
monitoring availability of a new spot instance; and
in response to a determination that the new spot instance is available, replacing the instance that does not respond with the new spot instance.

* * * * *